United States Patent Office 3,116,672
Patented Jan. 7, 1964

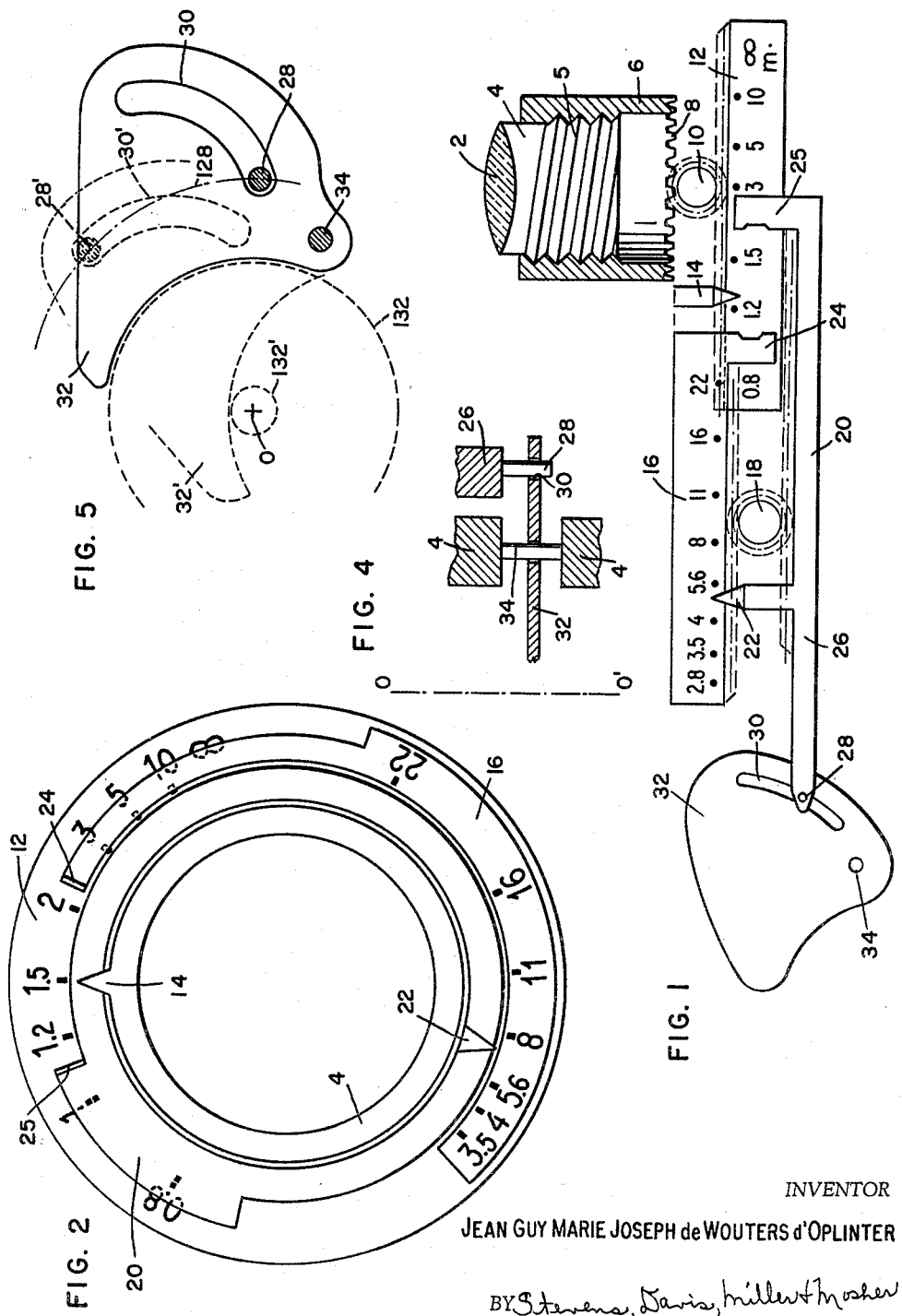

3,116,672
PHOTOGRAPHIC APPARATUS
Jean Guy Marie Joseph de Wouters d'Oplinter, Roquefort-les-Pins, France, assignor to La Spirotechnique
Filed Sept. 6, 1960, Ser. No. 54,216
Claims priority, application France Sept. 4, 1959
4 Claims. (Cl. 95—64)

The invention relates to an improvement in photographic, cinematographic, television and similar cameras especially those intended to be used under water.

It is more especially concerned with a photographic camera comprising means for regulating the focus and the aperture, and movable indexes defining on the range scale the depth of field corresponding to the selected range and aperture, and connected kinematically on the one hand to the control member for the diaphragm aperture and on the other hand to one another so that their displacements are effected in directions opposite to one another. Cameras of this type are already known, particularly in German patent application No. 1,020,232, in which the diaphragm control member is connected on the one hand to the diaphragm blades in the usual manner and on the other hand to depth of field indexes by a complex kinematic transmission system comprising a cam, a toothed sector, pinions and racks.

It has also been proposed in the prior art to use as movable indexes for the depth of field the edges of two circular sectors, one of which, carrying a diaphragm aperture scale, is connected on the one hand directly to the control mechanism of the diaphragm aperture and on the other hand to the other sector by means of a bevel pinion and racks. Nevertheless, the aforesaid prior art does not indicate any means permitting of connecting the movements, on the one hand of the diaphragm aperture mechanism and on the other hand of the aforesaid circular sectors, in such a manner as to satisfy simultaneously the laws concerning variation of the aperture and the depth of field when the control member of the diaphragm blades is operated. Actually, with the known objectives, the angular control movement necessary for causing a variation in the aperture in a given ratio is large in the zone of the large apertures and small in the zone of the small apertures; on the contrary, the concomitant variation of the depth of field is small for the large apertures and large for the small apertures. It is thus not possible to employ the edge of a sector connected directly to a conventional control mechanism for the diaphragm aperture and carrying in addition the aperture scale, for indicating exactly the depth of field on the range scale, contrary to that which is accepted in this patent.

The photographic camera according to the invention provides a very simple solution of the above problem and permits an exact and simultaneous indication of the depth of field and of the diaphragm aperture by means of a range scale of conventional type and of two sectors, one of which is directly connected to the control member for the diaphragm aperture, assuring thereby a kinematic relation between the movement of the diaphragm blades and that of the depth of field indexes different from that resulting from a direct connection.

It is characterized in that the diaphragm blades are connected to their control member by means of cams with which they are fast and in which can slide pins connected to this control member, the shape of these cams being calculated in such a way as to assume the mutual kinematic conversion of the movements of the indexes of the depth of field and of the blades.

The preferred embodiment of the invention is moreover characterised by the following points:

(a) A diaphragm aperture scale, of which the spacing of the graduations is larger for the small apertures than for the large apertures, is fast with one of the movable indexes for the depth of field;

(b) The index indicating the aperture, facing the aperture scale, is fast with the other movable index for the depth of field;

(c) The setting button for the aperture directly drives a bevel pinion which assures the mutual kinematic connection of the indexes for the depth of field;

(d) In the case where the camera is contained in a fluid-tight casing for isolating it from the ambient medium, for example for the object of submarine submersion, the scales and indexes of the control systems are disposed behind a window so as to be visible through the latter, and the control members for the aperture and the focusing are connected by means of fluid-tight shafts to external control buttons.

The graduations of the scales are moreover preferably arranged upside down so that they can easily be read by simply rotating the camera upwardly through a quarter of a turn.

Other improvements and advantages of the invention will become apparent from the detailed description which follows.

The invention will be hereinafter more fully described by reference to the accompanying drawings, given simply by way of example, wherein:

FIGURE 1 is a diaphragm illustrating the principle of an arrangement comprising the use of the improvement according to the invention, the scales being shown in developed form;

FIGURE 2 is a diagrammatic front elevation of one industrial embodiment of the invention in which the reading of the settings is carried out by means of graduated sectors movable about the objective mount;

FIGURE 4 is an enlarged detail of FIGURE 3, showing the diaphragm control mechanism;

FIGURE 5 is a diagrammatic front elevation of the detail shown in FIGURE 4.

Figure 3:
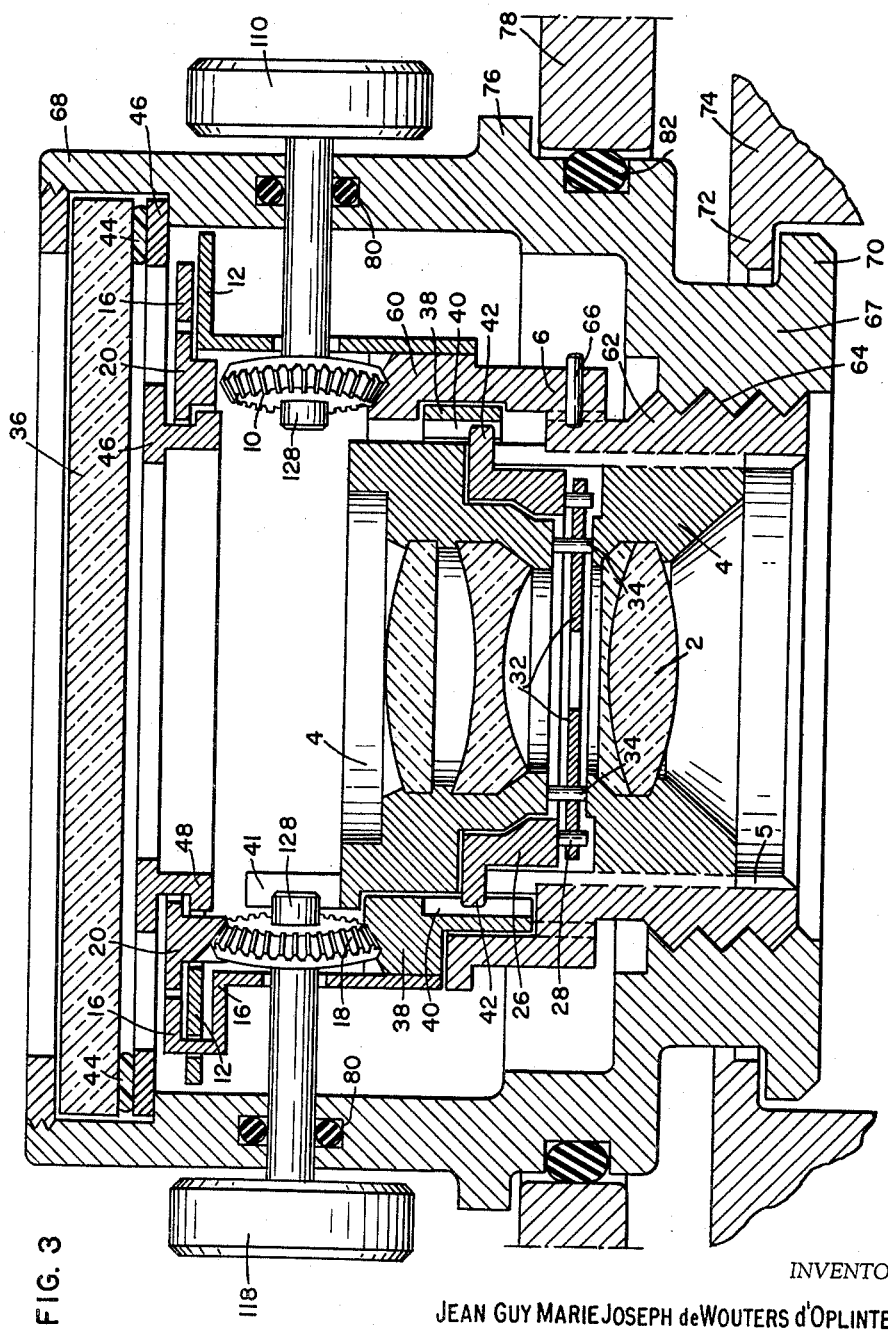
FIGURE 3 is a diagramamtic axial section of the arrangement shown in FIGURE 2.

Referring to FIGURE 1, which is only a very theoretical diagram intended for facilitating the understanding of the principle of the invention, it is seen that a photographic objective 2 is supported by a tube 4 provided with a helical cam 5 designed to cause it to slide in a ring 6 which is adapted to be rotated by a pinion 10 connected to the focusing control knob 110 (FIG. 3).

These members are of conventional type and do not form part of the invention. The pinion 10 also drives a movable scale 12 which is graduated in range settings and which is moved in front of a fixed index 14. Moving in front of the scale 12 are two sectors 24 and 25 which indicate the depth of field.

One of these sectors is connected to a movable scale 16 graduated in diaphragm stop values and the other is connected to a member 20 which is shown herein in the form of a rack, but which can be given any other suitable shape, more particularly that of a conically toothed ring, or even of a sector or a disc, in the same way as the range scale 12 and the diaphragm scale 16. Connected to the rack 20 are a movable index 22 moving in front of the diaphragm scale 16 and an arm 26 provided with a pin 28 engaging in a slot 30 formed in a diaphragm blade 32 pivotable about a fixed point 34.

The diagrammatic illustration of FIGURE 1 only shows a single diaphragm blade, but it must be understood that the diaphragm is formed in the conventional manner and comprises a certain number of identical blades, of which the novel feature resides essentially in the presence of a slot 30 of a particular shape, which determines the law of rotation of the blade as a function of the movement of the control pin 28. This feature will be hereinafter described in detail by reference to FIGURES 4 and 5.

The scale 16 indicating the setting of the diaphragm and the rack 20 are each in mesh with a pinion 18 fast with the diaphragm setting knob 118 (FIG. 3) and on either side of the axis of this pinion, so that the movable index 22 is moved in a direction opposite to the scale 16. The result is that the sectors 24 and 25 connected to the said scale and the said index, respectively, tend to move towards one another and consequently to indicate an area of more reduced depth of field when the diaphragm aperture is large. This effect is further accentuated, as hereinbefore indicated, by selecting a scale with a very specific graduation for the sector 16, since this graduation has spacings which increase from the larger apertures, for example $f:2.8$, towards the small apertures, $f:22$. Therefore, contrary to the usual arrangement the spacing between $f:16$ and $f:22$ will be larger than between $f:3.5$ and $f:4$. The particular shape of the recesses or driving cams 30 of the diaphragm blades, which have been hereinbefore referred to, has the effect of harmonising the movement of these blades with the particular movement of the scale 16 and the rack 20, it being moreover possible for the driving member 26 of the blades 32 to be connected in equivalent manner to one or other of these movable members in converse manner.

This specific graduation of the sector 16 permits the standard graduation imposed by the pitch of the thread 5 of the objective mount to be maintained for the range scale 12, while obtaining, by means of a calculation which will readily be brought within the scope of the person skilled in the art by the above indications, a law regarding the displacement of the depth of field sectors 24 and 25 with respect to the graduations of the range scale 12, so that the reading supplied by these sectors corresponds simultaneously to the range read off at the fixed index 14 and the diaphragm aperture read off at the movable index 22.

FIGURE 3 is a diagrammatic and simplified axial section of one industrial embodiment of the invention as applied to a photographic apparatus of the fluid-tight type intended for use under water.

The objective 2 is formed of several lenses assembled in a mount 4. This mount is given a translatory movement by a helical cam 5 meshing with the internal thread of a focusing ring 6, which is itself driven in rotation by a bevel pinion 10 operated by a knurled knob 110. A focusing scale 12 is fast with the ring 6 and is in the form of an annulus, of which the graduated front surface is visible through a liquid-tight window 36 positioned in front of the objective.

The ring 6 is formed of two parts which slide relatively to one another, namely, an external sleeve 60 which can only be rotated and comprises teeth meshing with the pinion 10, and an internal sleeve 62 having a helical movement, the latter sleeve being rotated by the sleeve 60 by means of pins 66 engaging in external grooves of the sleeve 62, which is provided at the other end with an external screwthread 64 meshing with an internal thread of the objective barrel 67, this thread forming the helical focusing cam. The internal sleeve 62 is also formed with an internal thread 5, shown in broken lines, for transforming its helical movement into an axial translation of the mount 4, which is guided axially by grooves, only one of which is shown at 41. According to one simple and convenient embodiment, these grooves or slots engage with the end 128 of the driving shaft of the bevel pinion projecting inside the objective mount.

Situated inside the sleeve 60 is a third sleeve 38 which turns freely in the sleeve 60. This sleeve 38 is formed with teeth by which it is rotated by a bevel pinion 18 fast with a knurled knob 118 for setting the diaphragm 32.

To this end, the sleeve or ring 38 is formed with external grooves 40 for rotating pins 42 which are fixed to the diaphragm setting ring 26. This ring 26 is itself rotatable in a groove formed in the periphery of the objective mount 4. It is provided on its internal surface with small projections or studs 28 for driving the diaphragm blades 32, which are pivoted on fixed pivots 34 fast with the objective mount 4. The diaphragm setting ring 38 is fast with a diaphragm setting scale or sector 16, the general appearance of which can be better seen in FIGURE 2.

The pinion 18 also drives a toothed ring 20 adapted to drive the movable index 22 for setting the diaphragm and shown in FIGURE 2, as well as the sector 25 for indicating the depth of field, the other sector 24 being fast with the sector 16 forming the diaphragm setting scale.

A cover 68 designed to hold the window 36 is screwed in fluid-tight manner on the objective barrel 67, by applying the said window to a plastic packing 44 pressed against the front face of a grooved rigid disc 46. The latter is thus locked against the front face of the barrel 67. The particular purpose of this disc 46 is to support the fixed focusing index 14, which is shown in FIGURE 2, and to guide the movable ring 20, this guiding action being achieved by means of a ring 40 which is fast with the disc 46 and formed with an annular groove for guiding the ring 20.

Finally, in order to permit the use of interchangeable objectives, the barrel 67 will for example be provided with pins 70 engaging in grooves of a ring 72 fast with the front wall 74 of the camera housing to provide a bayonet connection. It will also be provided with a flange 76 bearing on the casing 78 of the apparatus and a toric joint 82 ensuring the fluid-tightness with the said casing, the object of this arrangement being to ensure perfect alignment of the focal plane of the objective with the camera housing 74 in spite of possible deformation of the external casing 78.

This assembly has only been shown very diagrammatically, it being understood that it forms a separate invention described in detail in another French patent application filed August 27, 1959, by the same applicant and entitled "Fluid-Tight Objective for Submarine Photographic Apparatus."

The shafts of the pinions 10 and 18 extend through the objective barrel 67 in fluid-tight manner and because of toric joints 80.

The embodiment which has just been described has only been given by way of example, and it will be apparent from this description that the invention is applicable to photographic apparatus of very different types, whether or not these are liquid-tight and whether or not they comprise interchangeable objectives.

For supplementing the description, FIGURES 4 and 5, show diagrammatically and on an enlarged scale a part of the diaphragm control mechanism.

FIGURE 4 is a diagrammatic section in which is shown a diaphragm blade 32 supported by a fixed pivot 34 mounted at its two ends in the objective mount 4.

FIGURE 5 is a simplified plan view of the same detail of the mechanism.

The blade 32 is formed with a groove in the form of an arcuate slot 30 in which is engaged a pin 28 fast with a ring 26 which is adapted to be rotated by the setting ring 16 shown in FIGURE 3. The pin 28 thus describes an arc 128 of a circle, the centre of which is located on the optical axis of the objective, while the slot 30 of the diaphragm blade 32 describes an arc about a fixed pivot 34. Appropriate design of the slot or cam 30 makes it possible to establish a ratio between the angular displacements of the pin 28 and the blade 32 such that the sectors 24 and 25 for indicating the depth of field and shown in FIGURES 1 and 3, can be driven directly, one of them by the graduated ring 16 and the other by the ring 20 of the movable diaphragm index 22.

FIGURE 5 shows in broken lines the circle 132 corresponding to the largest diaphragm aperture and the circle 132' corresponding to the smallest diaphragm aperture for which the blade 32 will take up the position shown in broken lines at 32', while the driving cam 30 takes up a position at 30' and the pin 28 at 28'.

The embodiment of the invention which has just been described obviously only represents a non-limitative example and it would be possible in equivalent manner and without departing from the scope of the invention to develop various modifications making use of the same principles.

What I claim is:

1. In a photographic apparatus, in combination, means for adjusting the focus range and the diaphragm aperture, a range scale, two movable indexes cooperating with said range scale for showing the depth of field corresponding to the selected range of focus and aperture, said means for adjusting the diaphragm aperture comprising a diaphragm aperture control pinion, two connecting members drivable in opposite directions by said control pinion and carrying respectively said depth of field indicating indexes, a diaphragm aperture scale and a diaphragm aperture indicating index also respectively carried by said connecting members, the spacing between the consecutive markings of said diaphragm aperture scale increasing in inverse ratio to the diaphragm aperture to show simultaneous indications of the diaphragm aperture by the diaphragm aperture scale and its cooperating index and of the corresponding depth of field by the depth of field indexes on the range scale, a diaphragm setting ring provided with peripheral pins and adapted to link operatively one of said connecting members with diaphragm blades, each of said pins being slidable in an arcuate slit of a diaphragm blade for driving said blade, the form of said slit corresponding step by step to the position of each actuating pin on its respective diaphragm blade for a setting of said actuating pin and diaphragm blade corresponding to the indication of the diaphragm aperture scale.

2. In a photographic apparatus, in combination, a lens mount axially displaceable within an external barrel, means for adjusting the focus range and the diaphragm aperture, a range scale, two movable indexes cooperating with said range scale for showing the depth of field corresponding to the selected range of focus and aperture, said means for adjusting the diaphragm aperture comprising a toothed ring and a toothed sleeve, coaxial with the lens mount, adapted to rotate within said barrel but axially fixed with respect thereto, a bevel pinion drivable by an aperture control knob located on said barrel, said bevel pinion meshing with said toothed ring and toothed sleeve and adapted to drive them in opposite directions, said toothed ring carrying one of said depth of field indicating indexes and the diaphragm aperture scale markings, said toothed sleeve carrying the other of said depth of field indicating indexes and the diaphragm aperture indicating index, a diaphragm setting ring coaxial with the lens mount and adapted to rotate in engagement with a groove at the periphery of said lens mount, said diaphragm setting ring being slidably secured to said toothed sleeve and provided with peripheral pins, each of said pins being slidable in an arcuate slit of a diaphragm blade for actuating said blade around a pivot located in the objective mount.

3. The combination according to claim 2, wherein said means for adjusting the focus comprises a bevel pinion drivable by a control knob located on said barrel, a toothed sleeve, rotatable within said barrel but axially fixed with respect thereto and meshing with said bevel pinion, a range scale, carried by said sleeve, and the lens mount, matingly engaging the barrel through screw threads and slidably secured to said sleeve to be rotated thereby.

4. The combination according to claim 3, wherein said external barrel is fluid-tight, the scales and indexes being located inside said barrel behind a fluid-tight window, so as to be visible through the latter, and the pinions for adjusting the aperture and the focus being coupled by fluid-tight shafts to said control knobs.

References Cited in the file of this patent

UNITED STATES PATENTS

| | | |
|---|---|---|
| 2,901,956 | Werner | Sept. 1, 1959 |
| 2,916,980 | Schutz | Dec. 15, 1959 |
| 2,975,692 | Rentschler | Mar. 21, 1961 |